(12) United States Patent
Owejan et al.

(10) Patent No.: US 7,749,637 B2
(45) Date of Patent: Jul. 6, 2010

(54) WATER BLOCKING LAYER AND WICKING RESERVOIR FOR PEMFC

(75) Inventors: Jon P. Owejan, Honeoye, NY (US);
Chunxin Ji, Rochester, NY (US);
Thomas A. Trabold, Pittsford, NY (US);
Michael Cartwright, Naples, NY (US);
Steven G. Goebel, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1325 days.

(21) Appl. No.: 11/229,909

(22) Filed: Sep. 19, 2005

(65) Prior Publication Data

US 2007/0065708 A1   Mar. 22, 2007

(51) Int. Cl.
*H01M 8/02* (2006.01)
*H01M 8/10* (2006.01)

(52) U.S. Cl. .......................................... 429/38; 429/30

(58) Field of Classification Search ............ 429/30, 429/38, 44
See application file for complete search history.

(56) References Cited

U.S. PATENT DOCUMENTS

| | | | | |
|---|---|---|---|---|
| 6,106,965 | A * | 8/2000 | Hirano et al. | 429/30 |
| 6,350,539 | B1 * | 2/2002 | Wood et al. | 429/34 |
| 6,576,358 | B2 | 6/2003 | Gebhardt et al. | |
| 2005/0221134 | A1 * | 10/2005 | Liu et al. | 429/13 |
| 2006/0154124 | A1 * | 7/2006 | Fowler et al. | 429/22 |
| 2006/0199061 | A1 * | 9/2006 | Fiebig et al. | 429/32 |

FOREIGN PATENT DOCUMENTS

| | | |
|---|---|---|
| DE | 198 03 132 C1 | 4/1999 |
| DE | 198 59 765 A1 | 6/2000 |
| DE | 199 14 247 A1 | 10/2000 |
| DE | 100 52 190 A1 | 5/2002 |
| DE | 100 52 224 A1 | 7/2002 |
| EP | 1 538 689 A2 | 6/2005 |

OTHER PUBLICATIONS

"Water Management in PEMFC's Using Absorbent Wicks", Shan-Hai Ge, Xu-Guang Li, and I.-Ming Hsing, Journal of The Electrochemical Society, pp. B523-B528.

* cited by examiner

*Primary Examiner*—Gregg Cantelmo
(74) *Attorney, Agent, or Firm*—John A. Miller; Miller IP Group, PLC

(57) ABSTRACT

A fuel cell including a water blocking layer positioned between anode gas flow channels and a gas diffusion media. The blocking layer prevents water from propagating through the gas diffusion media layer and entering the anode flow channels, while allowing gas from the flow channels to flow through the diffusion media layer to the membrane. A water accumulation channel can be provided around the perimeter of the gas diffusion media layer where blocked water is accumulated, and allowed to expand during cell freezing. A porous capillary wick can be provided in the accumulation channel for wicking water to the inlet end of the flow channels where it is used to humidify the anode gas coming into the fuel cell. The wick can have a tapered configuration so that it has a larger diameter at the gas input end of the flow channels.

22 Claims, 3 Drawing Sheets

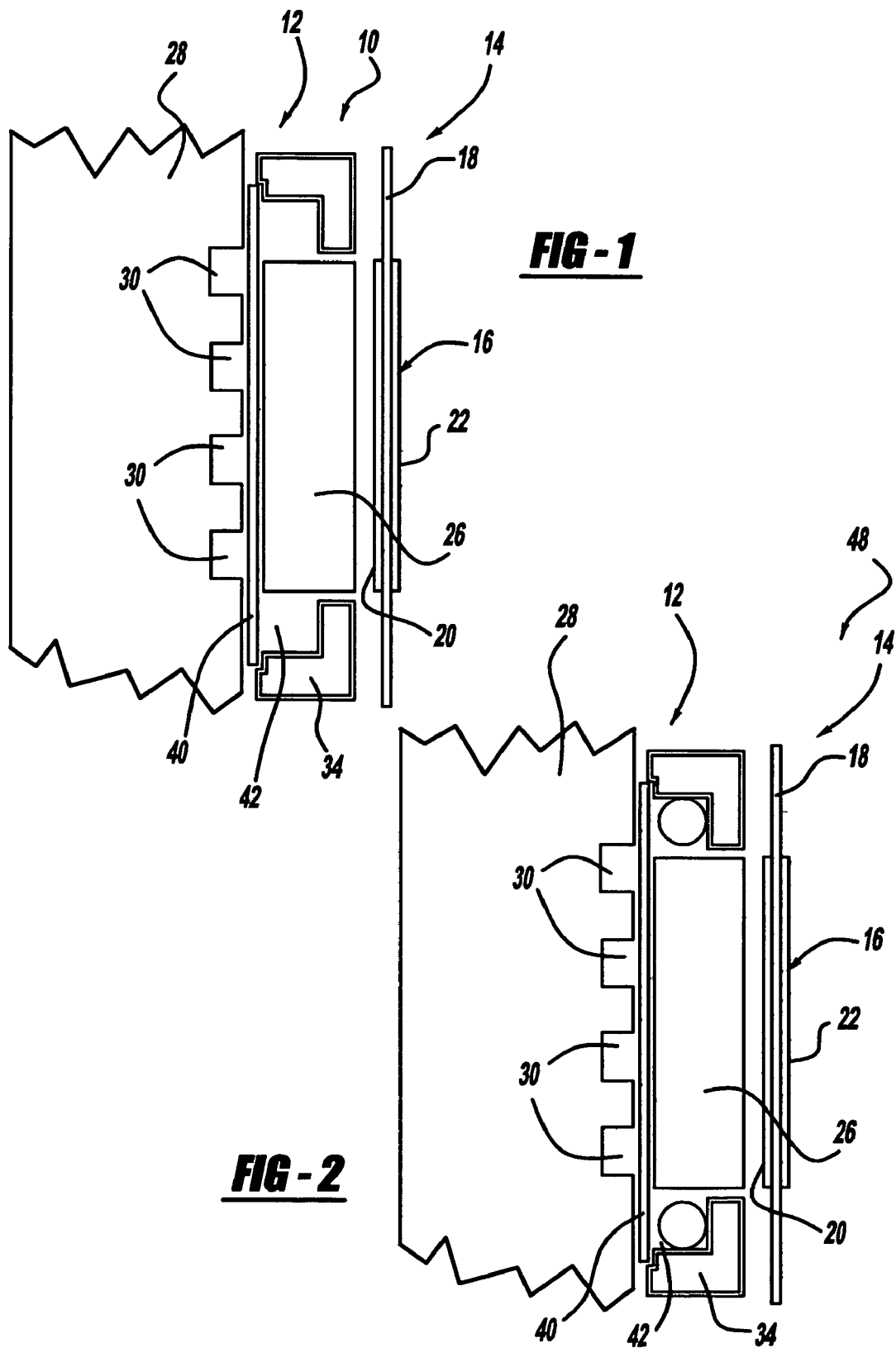

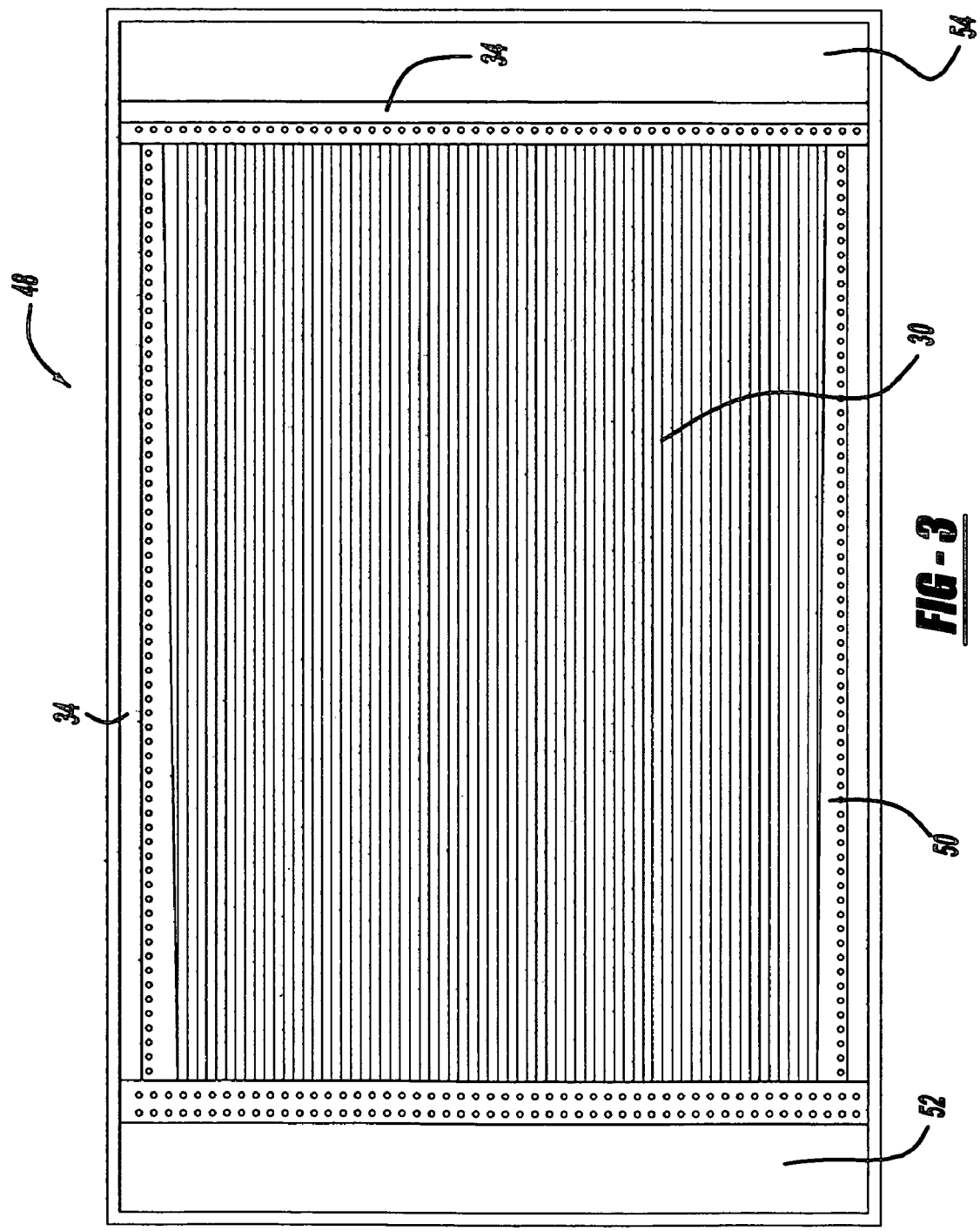

WATER BLOCKING LAYER AND WICKING RESERVOIR FOR PEMFC

BACKGROUND OF THE INVENTION

1. Field of the Invention

This invention relates generally to a fuel cell and, more particularly, to a fuel cell employing a water blocking layer for preventing water from entering anode gas delivery channels and a wick positioned within a water accumulation channel for directing water to an inlet end of the anode gas delivery channels.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. For the automotive fuel cell stack mentioned above, the stack could include about two hundred bipolar plates. The bipolar plates include an anode side and a cathode side for adjacent fuel cells in the stack. Anode gas flow channels are provided on the anode side of the bipolar plates that allow the anode gas to flow to the anode side of each MEA. Cathode gas flow channels are provided on the cathode side of the bipolar plates that allow the cathode gas to flow to the cathode side of each MEA. The bipolar plates are made of a conductive material, such as stainless steel, so that they conduct the electricity generated by the fuel cells from one cell to the next cell as well as out of the stack. The bipolar plates also include flow channels through which a cooling fluid flows.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. A flow channel in which liquid water has accumulated will have a lower flow than the flow channels where no water has accumulated. Because the flow channels are in parallel, the input gas may not flow through a channel with water accumulation, thus preventing the water from being forced out and allowing for increased water accumulation therein. Those areas of the membrane that do not receive input gas as a result of the channel being blocked will not generate electricity, thus resulting in a non-homogenous current distribution and reducing the overall efficiency of the fuel cell. Significant water accumulation in a single cell could result in severe reactant blockage to that cell and cause the cell to fail. Because the fuel cells are electrically coupled in series, if one of the fuel cells stops performing, the entire fuel cell stack may stop performing.

It is usually possible to purge the accumulated water in the flow channels by forcing the anode gas or the cathode gas through the flow channels at a higher flow rate. However, there are many reasons not to use the hydrogen fuel as a purge gas, including reduced economy, reduced system efficiency and increased system complexity for treating elevated concentrations of hydrogen in the exhaust gas stream. For these reasons, it will be desirable to at least minimize the water accumulating in the anode side flow channels of the fuel cells so that the hydrogen gas is not wasted for purging the anode flow channels.

Reducing accumulated water in the channels can also be accomplished by reducing inlet humidification. However, it is desirable to provide some relative humidity in the anode and cathode gases so that the membrane in the fuel cells remains hydrated. A dry inlet gas has a drying effect on the membrane that could increase the ionic resistance, and limit the membrane's long-term durability.

Accumulated water in the cells can also reduce performance of the fuel cell when operated in an environment where the temperature goes below 0° C. The accumulated water could also lead to mechanical damage in these environments.

SUMMARY OF THE INVENTION

In accordance with the teachings of the present invention, a fuel cell that is part of a fuel cell stack in a fuel cell system is disclosed, where the fuel cell includes a water blocking layer positioned between anode gas flow channels and an anode side gas diffusion media layer. The blocking layer prevents liquid water from flowing through the gas diffusion media layer and entering the anode flow channels, while allowing gas from the flow channels to flow through the diffusion media layer to the membrane. A water accumulation channel can be provided around the perimeter of the gas diffusion media layer where blocked water is accumulated, and allowed to expand during cell freezing.

A porous capillary wick can be provided in the accumulation channel for wicking water to the inlet end of the flow channels where it is used to humidify the anode gas coming into the fuel cell. The wick can have a tapered configuration so that it has a larger diameter at the gas input end of the flow channels. Further, wicking fingers can be coupled to the capillary wick and extend into or adjacent to the diffusion media layer to allow water from an internal area of the fuel cell to be removed by the capillary wick. In an alternate embodiment, the water accumulation area is eliminated by extending the water blocking layer to be in close proximity to ends of the diffusion media layer and a sealing gasket.

Additional advantages and features of the present invention will become apparent from the following description and appended claims, taken in conjunction with the accompanying drawings.

BRIEF DESCRIPTION OF THE DRAWINGS

FIG. 1 is a partial cross-sectional plan view of a fuel cell in a fuel cell stack employing a water blocking layer between anode side flow channels and a cell MEA, according to an embodiment of the present invention;

FIG. 2 is a partial cross-sectional plan view of a fuel cell in a fuel cell stack employing a water blocking layer as shown in FIG. 1, and further employing a capillary wick positioned within a water accumulation channel;

FIG. 3 is a side plan view of the fuel cell shown in FIG. 2 showing the capillary wick extending around a perimeter of the cell from a gas inlet manifold to a gas outlet manifold;

DETAILED DESCRIPTION OF THE EMBODIMENTS

Figure 4:
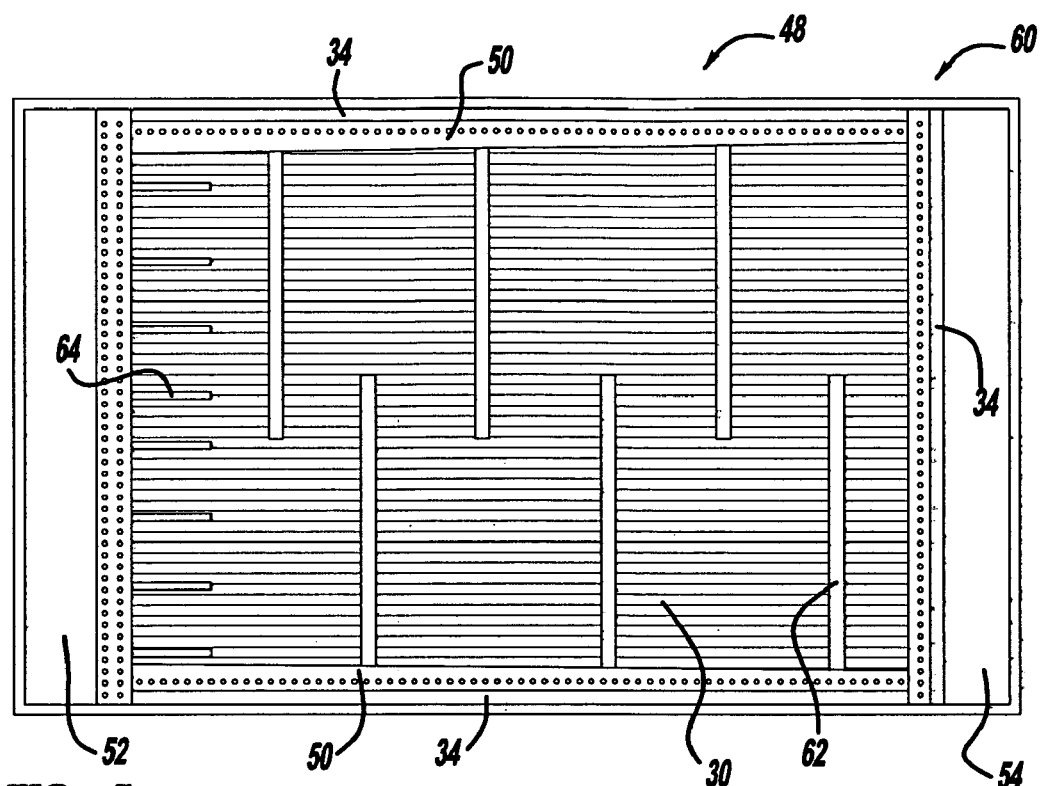
FIG. 4 is a side plan view of a fuel cell of the type shown in FIG. 5 and including wicking fingers extending into an interior of the fuel cell for drawing water out of the gas diffusion media layer, according to another embodiment of the present invention.

The following discussion of the embodiments of the invention directed to a fuel cell including a water blocking layer and a capillary wick is merely exemplary in nature, and is in no way intended to limit the invention or its applications or uses.

FIG. 1 is a cross-sectional plan view of a fuel cell 10 that would be one fuel cell in a fuel cell stack, for example, a fuel cell stack in a vehicle. The fuel cell 10 includes an anode side 12 and a cathode side 14. An MEA 16 is positioned between the anode side 12 and the cathode side 14, and includes an electrolyte membrane 18 having a catalyst layer 20 on the anode side 12 of the membrane 18 and a catalyst layer 22 on the cathode side 14 of the membrane 18. An anode side gas diffusion media layer 26 is positioned adjacent to the MEA 16 on the anode side 12 and an anode side bipolar plate 28 is positioned on an opposite side of the gas diffusion media layer 26 from the MEA 16. The anode side bipolar plate 28 includes a series of anode flow channels 30 through which an anode input gas, particularly hydrogen, flows into the fuel cell 10 to react with the catalyst layer 20. The gas diffusion media layer 26 is a porous layer that provides for input gas transport to and water transport from the MEA 16. A gasket 34 seals the membrane 18 to the bipolar plate 28.

The cathode side 14 of the fuel cell 10 would also include a cathode side gas diffusion media layer and a cathode side bipolar plate including cathode gas flow channels, as would be well understood to those skilled in the art. Additionally, an opposite side of the bipolar plate 28 would be the cathode side including cathode flow channels for an adjacent fuel cell to the fuel cell 10 in the fuel cell stack.

According to the invention, a water blocking layer 40 is positioned between the bipolar plate 28 and the gas diffusion media layer 26. The water blocking layer 40 prevents liquid water flowing through the gas diffusion media layer 28 from the MEA 16 from entering the anode flow channels 30, thus preventing accumulation of water therein and preventing the channels 30 from being blocked. The blocking layer 40 is a thin and flexible layer, is suitably porous so it does not impede hydrogen transport, is hydrophobic so that liquid water cannot pass through and is electrically and thermally conductive so as to not significantly increase cell resistance or temperature gradients relative to the catalyst layer 20 on the MEA 16. In one non-limiting example, the water blocking layer 40 is made of commercially available Carbel MP30Z and has a thickness of about 50 microns.

The water blocking layer 40 forces diffusion to be the dominant transport mechanism from the channels 30 to the gas diffusion media layer 26 by eliminating in-plane by-pass of reactant gas through the diffusion media layer 26. By eliminating the in-plane transport through the gas diffusion media layer 26, gas velocity in the flow channels 30 is increased, particularly for serpentine flow field where the channel pattern tends to force reactant gas flow through the diffusion media layer 26, further helping water management in the fuel cell 10. This will mitigate the affect of variation in the diffusion media in-plane permeability characteristics.

Additionally, the fuel cell 10 includes a water collection channel 42 extending around the perimeter of the gas diffusion media layer 26. The sealing gasket 34 is located to maintain a space beyond the diffusion media layer 26, and defines the channel 42. The channel 42 provides an area where the water that diffuses through the media layer 26 can accumulate, and then expand if the fuel cell 10 is in an environment where it may freeze. It has been found that the fuel cell durability and start-up under sub-freezing temperatures is greatly impacted by accumulated water in the flow channels 30 during freezing. However, partially accumulated water in the gas diffusion media layer 26 and in the channel 42 has limited effect on the start-up of the fuel cell 10.

Storing liquid water in the channels 42, and thus, partially in the gas diffusion media layer 26, would also provide for a more robust cell performance and durability by preventing the MEA 16 from drying out during transients and when the inlet operating conditions cannot be controlled properly. The water buffer will benefit cell performance through the diffusion of excess water from the gas diffusion media layer 26 to the MEA 16, keeping the proton conductivity in the MEA 16 high. The blocking layer 40 will also reduce shrink tension in the MEA 16 that could extend the life of the membrane 18.

FIG. 2 is a cross-sectional plan view of a fuel cell 48 similar to the fuel cell 10, where like elements are identified by the same reference numeral. FIG. 3 is a side plan view of the fuel cell 48 where the bipolar plate 28 and the blocking layer 40 have been removed. In this embodiment, a porous capillary wick 50 is positioned within the channel 42 and extends completely around the perimeter of the gas diffusion media layer 26. The hydrogen gas enters the flow channels 30 from an inlet manifold 52 and the remaining anode gas not consumed by the fuel cell 48 is output from the fuel cell 48 through an outlet manifold 54. As is well understood in the art, when an anode input gas that is not highly humidified enters the channels 30 from the inlet manifold 52 it is relatively dry, and thus acts to dry the membrane 18 at the inlet side of the fuel cell 48. As the anode gas propagates through the flow channels 30 to the outlet manifold 54 it accumulates moisture, increasing its relative humidity (RH), which helps keep the membrane 18 hydrated. Thus, it is desirable to increase the relative humidity of the anode input gas to maintain the membrane 18 hydrated at the inlet end of the flow channels 30.

The capillary wick 50 and the gasket 34 are configured so that the anode inlet gas from the inlet manifold 52 flows through the wick 50 and picks up water therefrom to increase its humidification. However, the anode exhaust gas exiting the flow channels 30 into the outlet manifold 54 is prevented from contacting the wick 50. Therefore, there is a drying of the wick 50 at the inlet side of the wick 50 relative to the outlet side of the wick 50, which provides a capillary flow through the wick 50 to the inlet end. The material of the wick 50 can be any material suitable for the purposes discussed herein, such as a polymer fiber or a microfiber material.

As is apparent, the wick 50 has a larger diameter adjacent to the inlet manifold 52 than the wick diameter at the outlet manifold 54. This difference in the diameter of the wick 50 provides an increased flow area to accommodate the increased water flow to the inlet manifold 52. The wick 50 can be a continuous length or separate sections that are coupled together.

FIG. 4 is a side plan view of a fuel cell 60 similar to the fuel cell 38 where like elements are identified by the same reference numeral. In this embodiment, wicking fingers 62 are coupled to the wick 50, and extend into the fuel cell 60. The wicking fingers 62 are perpendicular to the flow direction of the flow channels 30, and are positioned either adjacent to or within the gas diffusion media layer 26, not shown in FIG. 4. The wicking fingers 62 increase the flow of water from the gas diffusion media layer 26 to the wick 50 so that water is more readily removed therefrom. Additionally, wicking fingers 64 can be provided in combination with the wick 50 that extend in a parallel direction to the flow channels 30.

Figure 5:
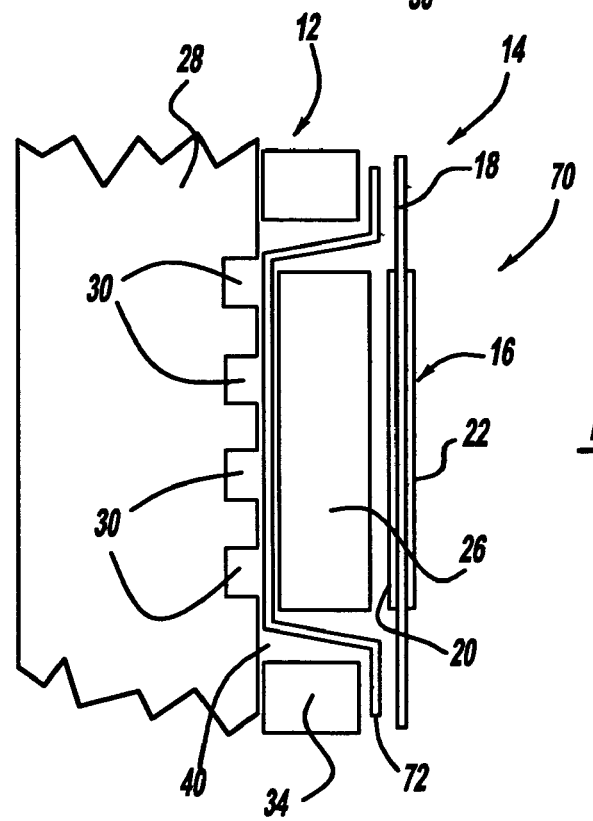
FIG. 5 is a cross-sectional plan view of a fuel cell in a fuel cell stack including a modified water blocking layer, according to another embodiment of the present invention.

FIG. 5 is cross-sectional plan view of a fuel cell 70 similar to the fuel cells 10 and 48 discussed above, where like reference numerals identify like elements. In this embodiment, the blocking layer 40 is replaced with a blocking layer 72 that is in more intimate contact with the gasket 34 and the gas diffusion media layer 26. Water is not removed from the anode side 12 of the fuel cell 70, but is removed from the cathode side 14 where increased flow can be used to remove excess water without wasting fuel to the exhaust as would be required to purge excess water from the anode side 12. In this configuration, water accumulation in the anode side 12 will reach steady state once its partial pressure is equivalent to the cathode side 14. This water may then be removed by decreasing the liquid water partial pressure in the cathode side 14. This creates a concentration gradient across the MEA 16 that is the driving force to remove accumulated water from the anode side 12 to the cathode side 14. This prevents the accumulation of water on the anode side 12 of the fuel cell 70, which eliminates the chance for water freezing on the anode side 12 and damaging the fuel cell 70.

The discussion above only talks about providing a water blocking layer and a wick on the anode side 12 of the fuel cell 10. However, as will be appreciated by those skilled in the art, a water blocking layer can be provided between the gas diffusion media layer and the cathode gas flow channels on the cathode side 14 of the fuel cell 10. Because air is readily available to purge the water out of the cathode flow channels, it is typically not as critical to prevent water from entering the cathode flow channels.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising:
    a membrane electrode assembly (MEA);
    a bipolar plate including gas flow channels;
    a water blocking layer positioned between the gas flow channels and the MEA, said water blocking layer preventing water from entering the gas flow channels and allowing gas from the flow channels to propagate through the blocking layer to the MEA; and
    a water accumulation channel for accumulating water that is blocked by the blocking layer.

2. The fuel cell according to claim 1 further comprising a diffusion media layer positioned between the water blocking layer and the MEA.

3. The fuel cell according to claim 1 further comprising a gasket for sealing the gas flow channels, said water accumulation channel being positioned between the gasket and a diffusion media layer.

4. The fuel cell according to claim 3 further comprising an elongated wick extending through the water accumulation channel, said wick wicking away water in the accumulation channel.

5. The fuel cell according to claim 4 wherein the gas flows through the wick at an inlet end of the flow channels and is prevented from contacting the wick at an outlet end of the flow channels.

6. The fuel cell according to claim 4 wherein a diameter of the wick is tapered so that the wick has a larger diameter at an inlet end of the flow channels and a smaller diameter at an outlet end of the flow channels.

7. The fuel cell according to claim 4 wherein the wick includes wick fingers extending into or adjacent to the gas diffusion media layer.

8. The fuel cell according to claim 7 wherein the wick fingers extend perpendicular to the flow channels or parallel to the flow channels.

9. The fuel cell according to claim 2 further comprising a gasket, wherein an edge of the water blocking layer extends between an edge of the gas diffusion media layer and the gasket and is positioned adjacent to the MEA.

10. A fuel cell including an anode side and a cathode side, said fuel cell comprising:
    a membrane electrode assembly (MEA) positioned between the anode side and the cathode side of the fuel cell;
    a bipolar plate positioned on the anode side of the fuel cell, said bipolar plate including anode gas flow channels;
    a gas diffusion media layer positioned on the anode side of the fuel cell adjacent to the MEA;
    a water blocking layer positioned between the anode flow channels and the diffusion media layer, said water blocking layer preventing water from the gas diffusion media layer from entering the anode flow channels and allowing gas from the flow channels to propagate through the blocking layer and into the diffusion media layer; and
    a water accumulation channel extending around the perimeter of the gas diffusion media layer, said water accumulation channel accumulating water that is blocked by the blocking layer.

11. The fuel cell according to claim 10 further comprising a gasket for sealing the anode flow channels, said water accumulation channel being positioned between the gasket and the diffusion media layer.

12. The fuel cell according to claim 10 further comprising an elongated wick extending through the water accumulation channel, said wick wicking away water in the accumulation channel.

13. The fuel cell according to claim 12 wherein the anode gas flows through the wick at an inlet end of the flow channels and is prevented from contacting the wick at an outlet end of the flow channels.

14. The fuel cell according to claim 12 wherein a diameter of the wick is tapered so that the wick has a larger diameter at an inlet end of the flow channels and a smaller diameter at an outlet end of the flow channels.

15. The fuel cell according to claim 12 wherein the wick includes wick fingers extending into or adjacent to the gas diffusion media layer.

16. The fuel cell according to claim 15 wherein the wick fingers extend perpendicular to the flow channels or parallel to the flow channels.

17. The fuel cell according to claim 10 further comprising a gasket, wherein an edge of the water blocking layer extends between an edge of the gas diffusion media layer and the gasket and is positioned adjacent to the MEA.

18. A fuel cell including an anode side and a cathode side, said fuel cell comprising:
- a membrane electrode assembly (MEA) positioned between the anode side and the cathode side of the fuel cell;
- a bipolar plate positioned on the anode side of the fuel cell, said bipolar plate including anode gas flow channels;
- a gas diffusion media layer positioned on the anode side of the fuel cell adjacent to the MEA;
- a water blocking layer positioned between the anode flow channels and the diffusion media layer, said water blocking layer preventing water from the gas diffusion media layer from entering the anode flow channels and allowing gas from the flow channels to propagate through the blocking layer and into the diffusion media layer;
- a water accumulation channel extending around the perimeter of the gas diffusion media layer, said water accumulation channel accumulating water that is blocked by the blocking layer; and
- an elongated wick extending through the water accumulation channel, said wick wicking away water in the accumulation channel, wherein the anode gas flows through the wick at an inlet end of the flow channels and is prevented from contacting the wick at an outlet end of the flow channels.

19. The fuel cell according to claim 18 wherein a diameter of the wick is tapered so that the wick has a larger diameter at the inlet end of the flow channels and a smaller diameter at the outlet end of the flow channels.

20. The fuel cell according to claim 18 wherein the wick includes wick fingers extending into or adjacent to the gas diffusion media layer.

21. The fuel cell according to claim 20 wherein the wick fingers extend perpendicular to the flow channels or parallel to the flow channels.

22. A fuel cell comprising:
- a membrane electrode assembly (MEA);
- a bipolar plate including gas flow channels;
- a water blocking layer positioned between the gas flow channels and the MEA, said water blocking layer preventing water from entering the gas flow channels and allowing gas from the flow channels to propagate through the blocking layer to the MEA;
- a diffusion media layer positioned between the water blocking layer and the MEA; and
- a gasket, wherein an edge of the water blocking layer extends between an edge of the gas diffusion media layer and the gasket and is positioned adjacent to the MEA.

* * * * *